United States Patent
Beck et al.

(10) Patent No.: US 7,200,621 B2
(45) Date of Patent: Apr. 3, 2007

(54) SYSTEM TO AUTOMATE SCHEMA CREATION FOR TABLE RESTORE

(75) Inventors: Kevin L. Beck, Portland, OR (US); Paula N. Collins, Portland, OR (US); Vijay Gopalakrishnan, Karnataka (IN); Tania M. Zirn, Gladstone, OR (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 10/738,294

(22) Filed: Dec. 17, 2003

(65) Prior Publication Data

US 2005/0138087 A1    Jun. 23, 2005

(51) Int. Cl.
*G06F 17/30* (2006.01)

(52) U.S. Cl. ...................... 707/202; 707/204

(58) Field of Classification Search ............... 707/204, 707/102
See application file for complete search history.

(56) References Cited

U.S. PATENT DOCUMENTS

| | | | |
|---|---|---|---|
| 5,991,772 A * | 11/1999 | Doherty et al. ............. | 707/202 |
| 6,269,381 B1 | 7/2001 | St. Pierre et al. ........... | 707/202 |
| 6,366,987 B1 | 4/2002 | Tzelnic et al. .............. | 711/162 |
| 6,415,300 B1 | 7/2002 | Liu ............................ | 707/204 |
| 6,434,682 B1 | 8/2002 | Ashton et al. .............. | 711/162 |
| 6,453,325 B1 * | 9/2002 | Cabrera et al. ............. | 707/204 |
| 6,505,216 B1 | 1/2003 | Schutzman et al. ......... | 707/204 |
| 6,728,711 B2 * | 4/2004 | Richard ...................... | 707/204 |
| 2002/0059505 A1 | 5/2002 | St. Pierre et al. ........... | 711/162 |

OTHER PUBLICATIONS

Rama Velpuri: Oracle Backup & Recovery Handbook, Osborne McGraw-Hill, 1995 (pp. 54, 70-74, 188-199 and 220-221).*
Oracle7™ Server Utilities, Release 7.3, Feb. 1996, Oracleâ (pp. 1-1 to 1-32).*
Lightstone et al., "Toward Autonomic Computing With DB2 Universal Database", Sep. 2002, SIGMOD Record, vol. 31, No. 3, pp. 55-61.
Elie et al., Informed Dynamic Shared Path Protection, 2002, Optical Fiber Communication Conference—Postconference Technical Digest, Pt. 1, vol. 1, pp. 492-493.
Hohndel et al., "Automated Installation of Linux Systems Using YaST", Nov. 1999, 13th Systems Administration Conference, pp. 261-266.
Mitton et al., "Migrated Data Backup Utility", IBM Technical Disclosure Bulletin, vol. 37, No. 6B, pp. 505-508, Jun. 1994.

* cited by examiner

*Primary Examiner*—John Cottingham
*Assistant Examiner*—Kuen S. Lu
(74) *Attorney, Agent, or Firm*—Lieberman & Brandsdorfer, LLC (57) ABSTRACT

A method and system are provided to enable restoration of a base table and associated catalog table from a database. Table names and table identifiers are copied to a header of a storage media during a backup of the database. When a restore of a designated table is requested, table identifier data is extracted from the header of the storage media housing the backup of the database. Accordingly, the designated base table and associated catalog table(s) are restored from the storage media based upon data stored in the header of the storage media during the backup of the database.

12 Claims, 9 Drawing Sheets

SYSTEM TO AUTOMATE SCHEMA CREATION FOR TABLE RESTORE

BACKGROUND OF THE INVENTION

1. Technical Field

This invention relates to a method and system for restoring a table in a database. More specifically, the invention relates to extracting a base table from a database backup with minimal cost.

2. Description of the Prior Art

Large modern database management systems are commonly found in terabyte sizes on systems containing hundreds of CPUs and thousands of spindles. These systems also contain tens of thousands of database storage objects, such as relational tables and their associated access structures, including indexes, materialized views, and system catalogs. Today's databases are commonly backed up on recordable storage media, which may include CD-Roms, disks, and magnetic tape. In general, it is common practice to back up changes to the database on a daily basis, and to back up the entire database on a weekly basis.

Typically, a database includes catalog tables and base tables. The catalog tables store data that describes base tables. The base table is a table within the database that stores operator accessible and identifiable data. The data stored in the catalog table is not readily visible to an operator of the database. Rather the data stored in the catalog table pertains to meta-data. In the case of a database, the meta-data is in the catalog table and describes operator visible attributes of the base table, such as the names and types of columns. In addition to the catalog and base tables, the database includes an extent list which describes the physical location of pages of the catalog and base tables within the database. The extent list is stored in a special internal table which is not visible to operators of the database. This internal table that houses the extent list is known as the directory table. Accordingly, the directory table, catalog table, and base table function in a relational format to enable efficient use of data stored in the database.

Figure 1:
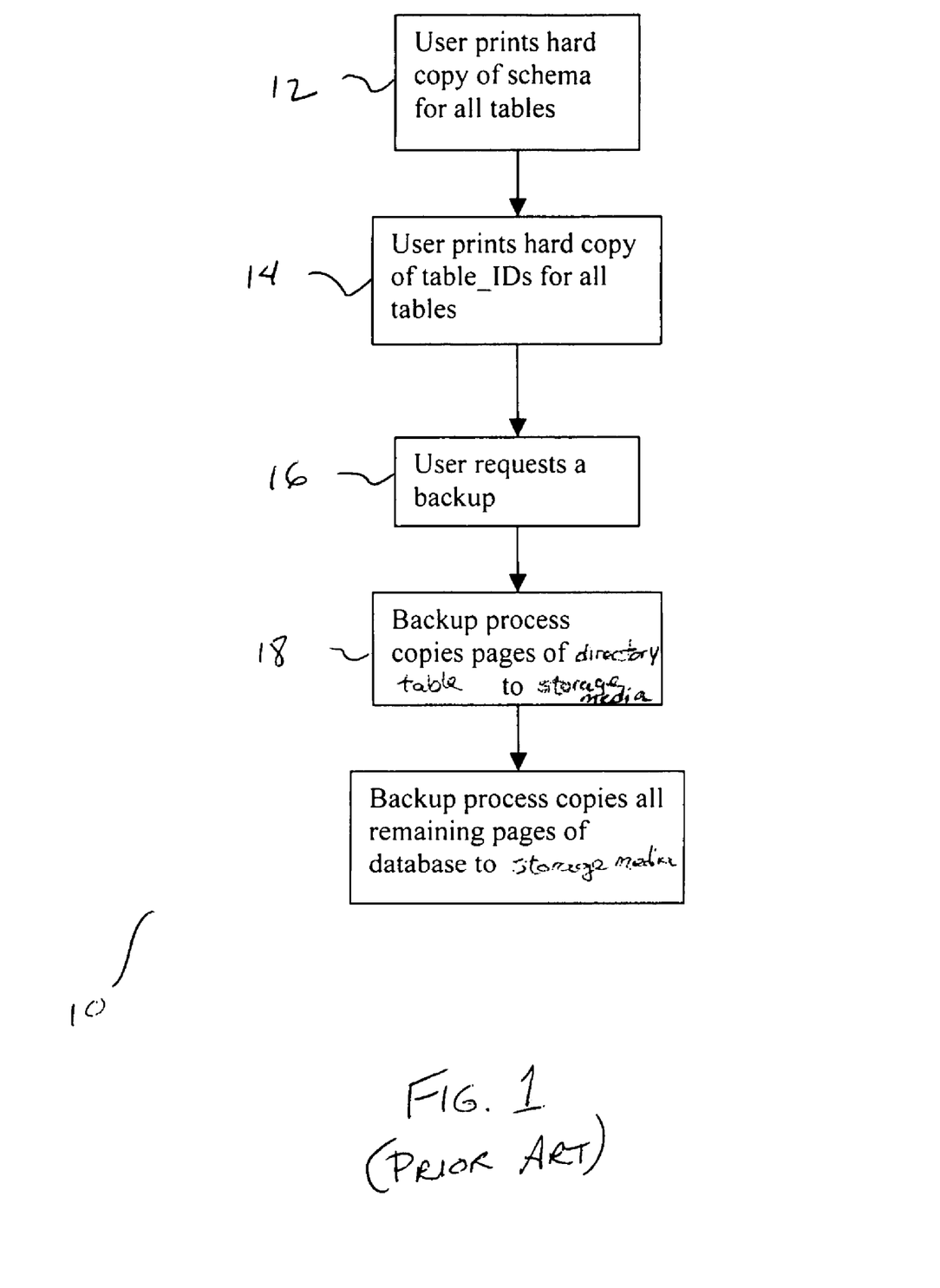
FIG. 1 is a flow chart of a prior art process of backing up a database.

A backup copy of the database usually holds only pages of data that were in use between the prior backup and the current backup, as these pages are the most likely to contain data that may have been subject to change. FIG. 1 is a flow chart (10), illustrating one implementation of a prior art process of creating a backup copy of a database and storing the backup copy on a recordable storage media. The operator of the database produces a hardcopy of the database schema for all tables in the database (12). Thereafter, the operator produces a hardcopy of the table identifiers for all tables in the database schema (14). Table identifiers are integers internal to the database that identify individual tables therein. Following creation of the hard copies at steps (12) and (14), the operator may request a backup operation of the database (16). The backup operation will copy pages of the directory table to the backup storage media (18). The directory table is the first table reproduced in the backup of the database because it contains information pertaining to the physical location of the base tables of the database. Following the backup of the directory table, the backup operation will copy all of the remaining pages of the database to the backup storage media (20). Accordingly, the prior art method for creating a backup of the database requires production of a hardcopy of both the database schema as well as the table identifiers for the tables in the database.

Figure 2A:
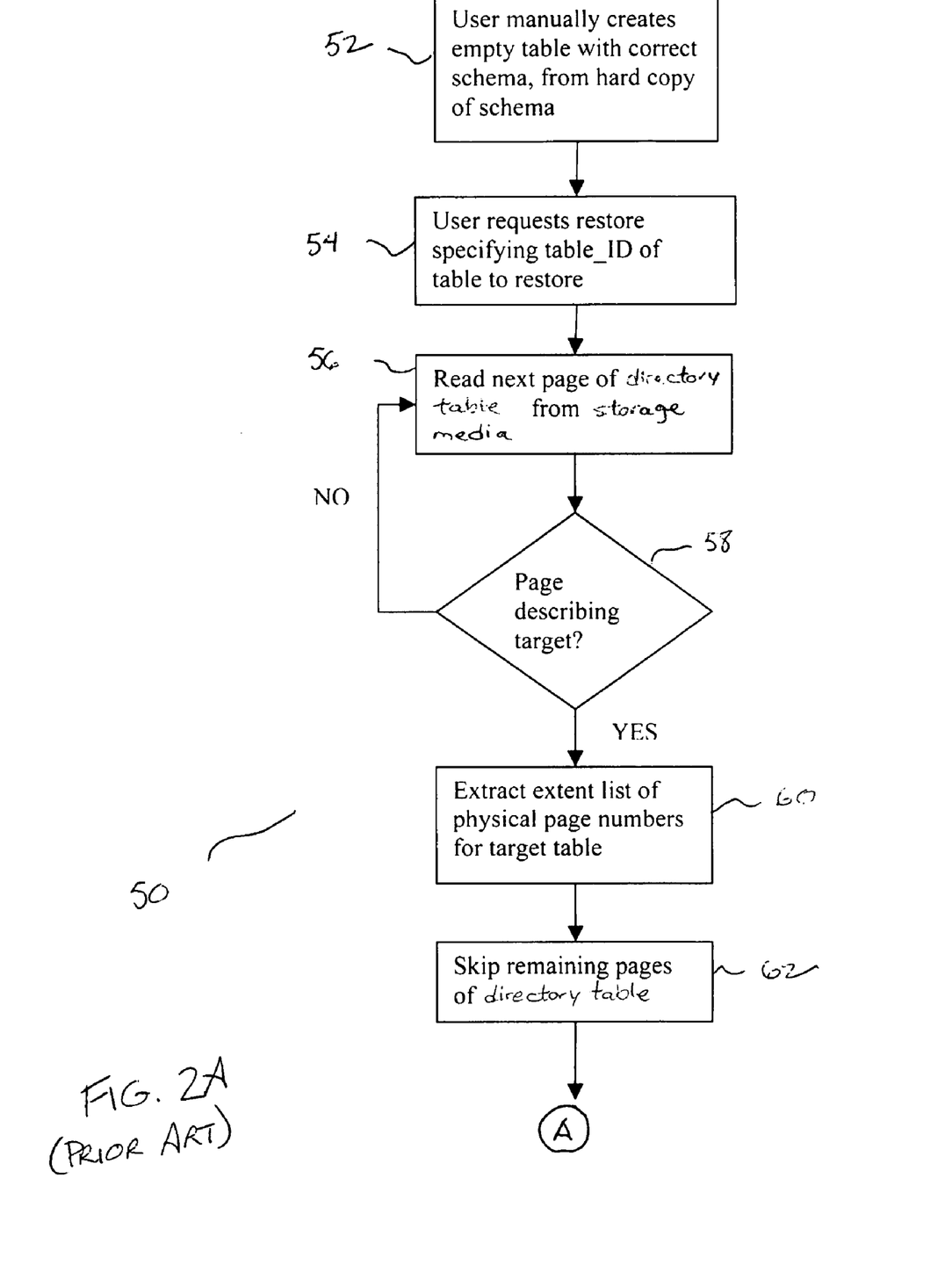
FIG. 2A is a flow chart of a first part of a prior art process for restoring a base table from a database backup.

Once the operator performs a backup of the database, it may become necessary at some point in time to restore one or more designated base tables from the backup. FIG. 2A is a flow chart (50) illustrating one prior art implementation of a first part of a process of restoring one or more designated base tables from a backup copy of the database. The operator requiring the table restore manually creates an empty base table with the schema of the base table to be restored (52), i.e. attributes of the table. The schema of the designated base table is obtained from the hardcopy that was produced at steps (12) and (14) during the backup of the database. The operator then requests a restore of the designated base table by providing the table identifier of the base table to restore (54). Following the operator initiated input at steps (52) and (54), a proceeding page of directory table are read from the backup storage media of the database (56). As indicated during the backup process (10), the table identifiers are internal database identifiers that identify tables within the database. A test is conducted to determine if the page of table identifiers read at step (56) describes the designated base table to be restored (58). A negative response to the test at step (58) will result in a return to step (56) for a reading of the proceeding page of table identifiers from the backup storage media. This process continues until a positive response is received from the test at step (58). Once a positive response is received, a list of physical pages identifying the location for the designated base table is extracted (60) and the remaining pages of the directory table may be passed over for review (62). Accordingly, the first part of the base table restoration process involves identifying the location of the physical pages of data provided by the table identifiers.

Figure 2B:
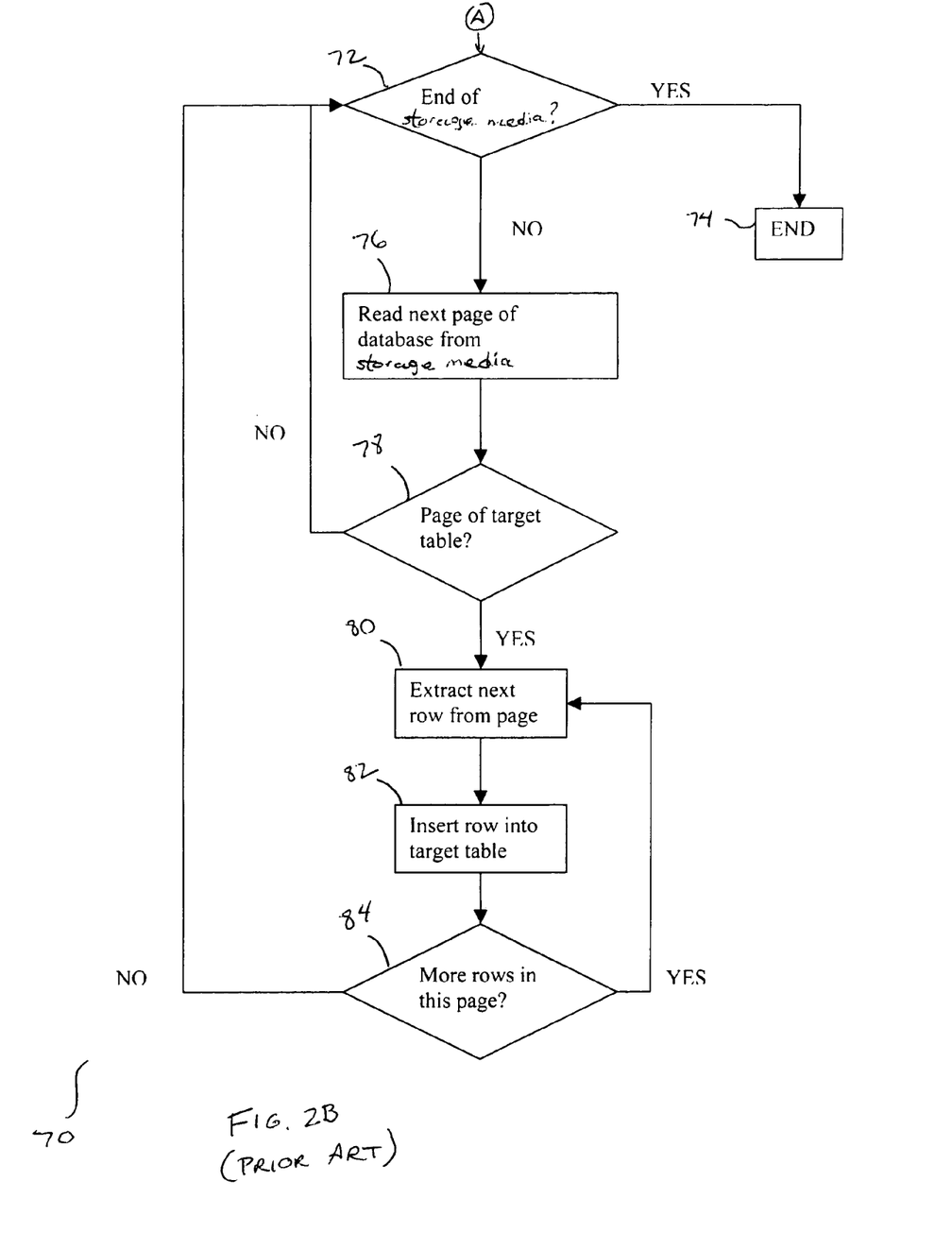
FIG. 2B is a flow chart of a second part of a prior art process for restoring a base table from a database backup.

Once the location of the designated base table information has been located, the designated base table restoration process extracts the designated base table data from the specified locations in the storage media. FIG. 2B is a prior art flow chart (70) illustrating the steps in completing the restoration process. A test is conducted to determine if the data extraction process has reached the end of the storage media (72). A positive response to the test at step (72) is an indication that the end of the storage media has been reached (74). However, with a negative response to the test at step (72), the process continues with reading the next page of the backup database (76). Thereafter, a test is conducted to determine if the page read at step (76) included data pertaining to the designated base table to be restored (78). A negative response to the test at step (78) will return to step (72). However, a positive response to the test at step (78) will cause an extraction of a row of data from the page of the backup storage media (80), which will be inserted into the designated base table (82) created at step (52). In general, the extracted data may include one or more rows of data. As such, following step (82), a test is conducted to determine if there is more than one row of data on the specified page of the backup tape (84). A positive response to the test at step (84) will cause a return to step (80) as this is an indication that there are a plurality of rows of designated base table data in the specified page of the backup storage media. However, a negative response to the test at step (84) will cause a return to step (72) to determine whether the identification and extraction process has reached the end of the backup storage media. Accordingly, the completion of the table restore process extracts one or more rows of designated base table data into the empty base table created at step (52).

The prior art process of restoring a designated base table from a database requires manual intervention for creation of the schema associated with the designated base table. However, in a large database system, generation and use of a hardcopy of the table schema is not efficient. In addition, restoration of a base table requires manual configuration of the schema of the base table by an operator as well as a prior identification of the table identifier. Accordingly, what is desirable is an efficient and effective method and system for backing up a database and subsequently restoring a base table based upon meta-data.

SUMMARY OF THE INVENTION

This invention comprises a method and system for recreating a database table in association with a backup of the database.

In one aspect of the invention, a method is provided for restoring a database table. All table name and table identifier data are copied to a header of a storage media during a backup process of a database. The table identifier data is extracted from the header of the storage media housing a backup of the database during a restoration of an identified base table. The identified base table is recreated based upon the extracted data.

In another aspect of the invention, a system to restore a database table is provided. The system includes a backup manager adapted to copy all table name and table identifier data to a header of a storage media during a backup process of a database. In addition, the system includes a restore manager adapted to extract table identifier data from the header of the storage media to recreate an identified base table based upon the extracted data.

In yet another aspect of the invention, an article is provided with a computer-readable signal-bearing medium. Means in the medium are provided for copying all table name and table identifier data to a header of a storage media during a backup process of a database. In addition, means in the medium are provided for extracting table identifier data from the header during a restoration of an identified base data. Means in the medium are also provided for recreating the identified base table based upon the extracted data.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A backup of a database creates a copy of changes to the database in storage media. In association with the backup process, meta-data of a database table enables an operator to recreate a database table from the backup on the storage media without a significant increase of costs to the backup process. In general, a large database typically may have in excess of 100,000 pages of data on the storage media. Table names and table identifiers, are stored in the backup header of the storage media during the backup process without disturbing the backup process or contributing any significant costs to the process. When restoring a table from a backup of the database, an operator initiates the restore process by reading the backup header from the storage media and extracting the meta-data pertaining to the database tables targeted for restoration. This header data allows meta-data to be extracted from the associated tables, which would otherwise be time consuming to search. Accordingly, the process of placing meta-data in a backup header of the storage media enables an operator to efficiently backup the database and at a later time to efficiently restore a designated base table from the meta-data.

Technical Details

Figure 3:
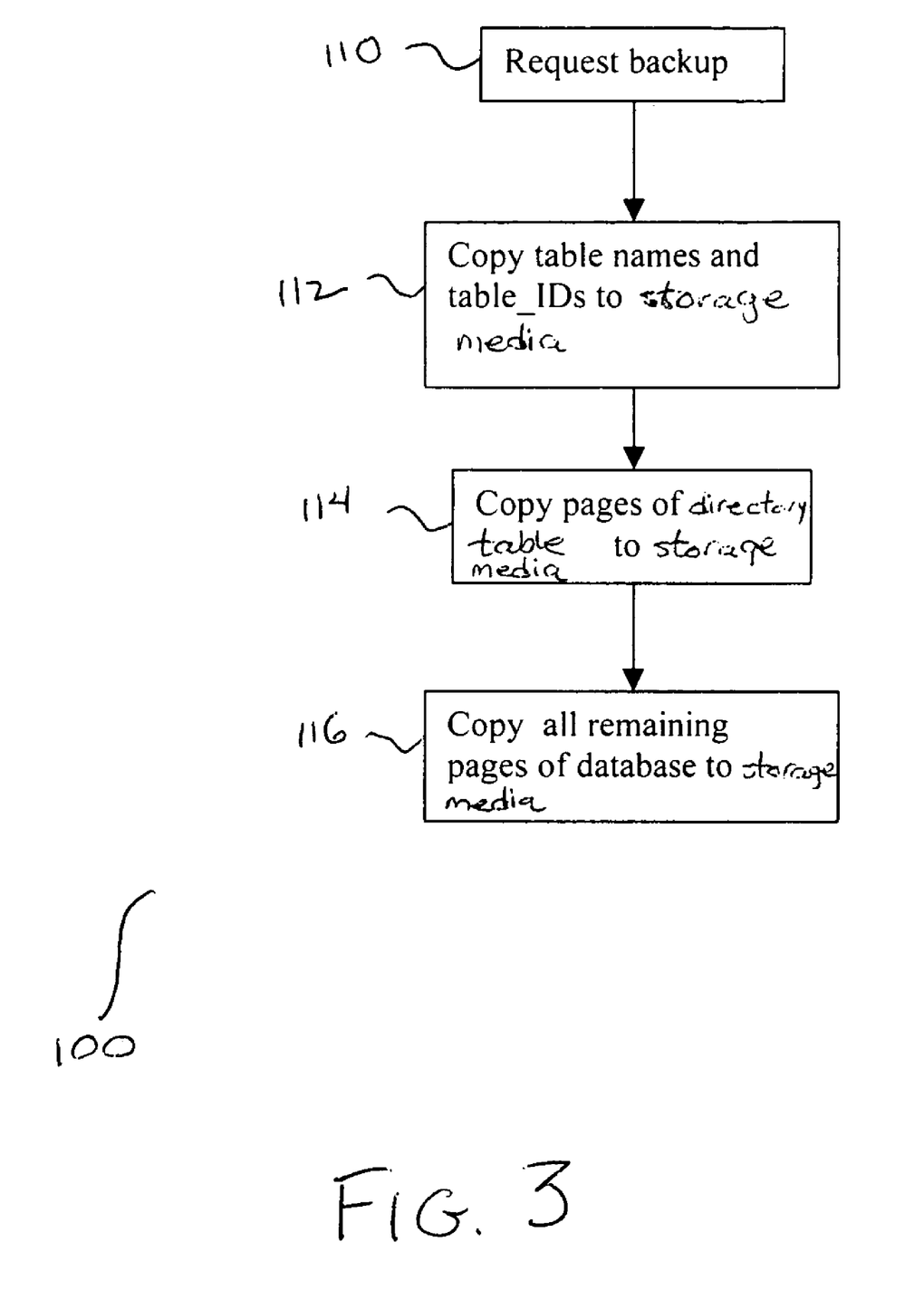
FIG. 3 is a flow chart of a process of backing up a database according to the preferred embodiment of this invention, and is suggested for printing on the first page of the issued patent.

FIG. 3 is a flow chart (100) illustrating a preferred method of creating a physical backup copy of a database on storage media. The operator of the database initially authorizes a command for a backup (110). Thereafter, all table names and table identifiers are copied onto a header of a backup storage media (112). The header of the storage media is a portion of the storage media that is initially accessible during restoration of the database. Pages of the directory table are copied to the storage media (114). Thereafter, all remaining pages of the database are copied to the storage media (116). Accordingly, the process of creating a backup copy of the database places all table names and table identifiers in the header of the storage media used to store the backup information.

Figure 4:
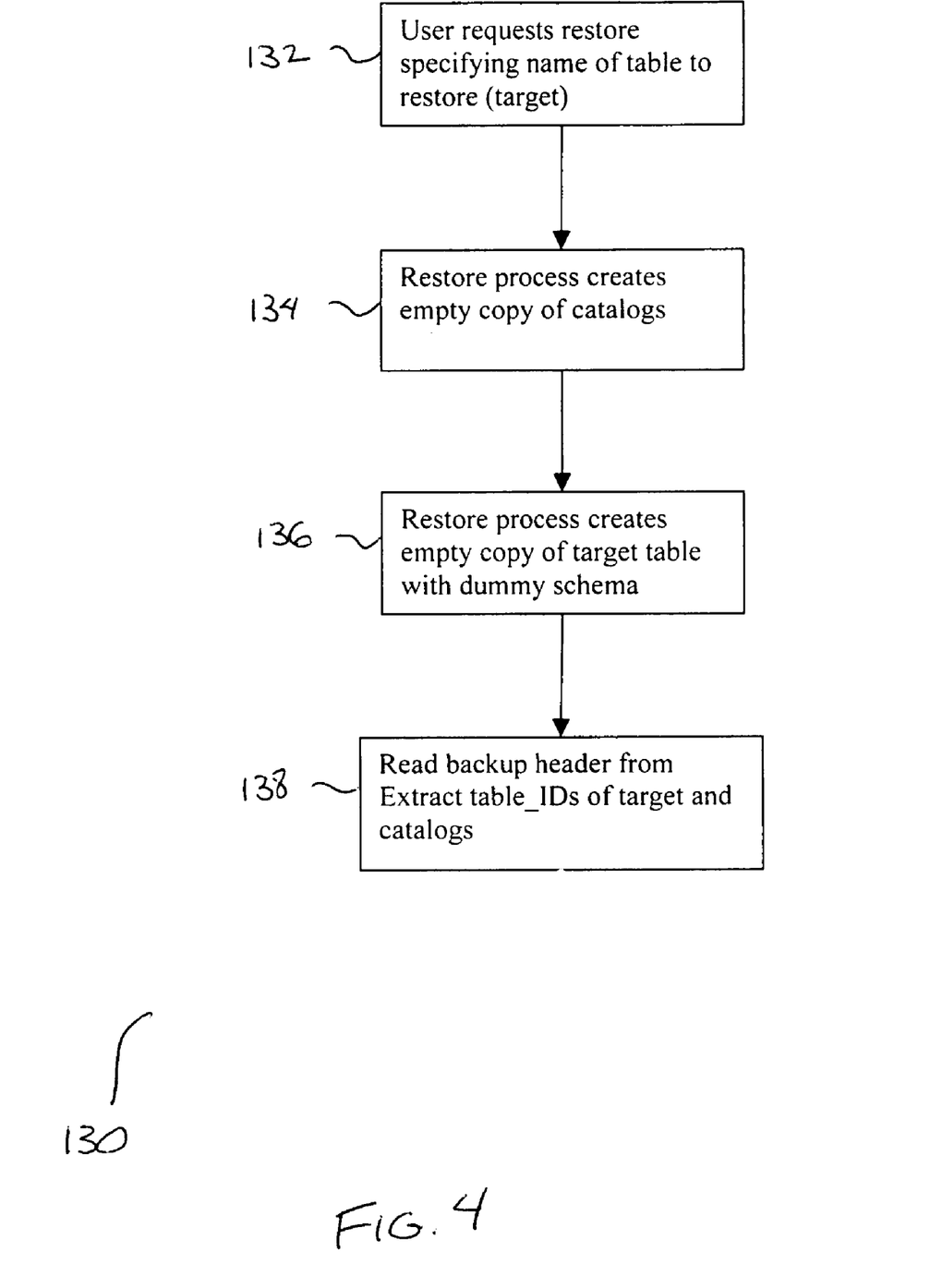
FIG. 4 is a flow chart of a first part of a process for restoring a selected base table from the database.

Once the database has been backed up to storage media and upon a need for restoring data, a base table may be selected for restoration from the storage media. In accordance with an embodiment of the present invention, FIG. 4 is a flow chart (130) illustrating a first part of a process for restoring a database table based upon the backup method shown in FIG. 3. An operator of the database requests a restoration of a specific base table in the database by specifying the name of the table (132). The restoration process creates an empty copy of a catalog table(s) associated with the specified base table using the known schema of the catalog table (134). Schema of the catalog table is obtained in the programming code of the database, or through an existing catalog table of the database. It should be noted that the schema of the catalog table are fixed. Thereafter, the restoration process creates an empty copy of the specified base table (136). This copy of the designated base table may include a dummy schema, which may or may not be visible to the operator. The dummy schema may be arbitrary. The backup header is then read from the storage media housing the backup of the database (138) created in FIG. 3. The process of reading the backup header includes extracting table identifiers associated with the specified base table and all associated base tables. The backup header created during the backup of the database stores meta data pertaining to attributes of the tables of the database. Accordingly, the first part of the process for restoring a specified base table includes reading the backup header from the storage media.

Figure 5:
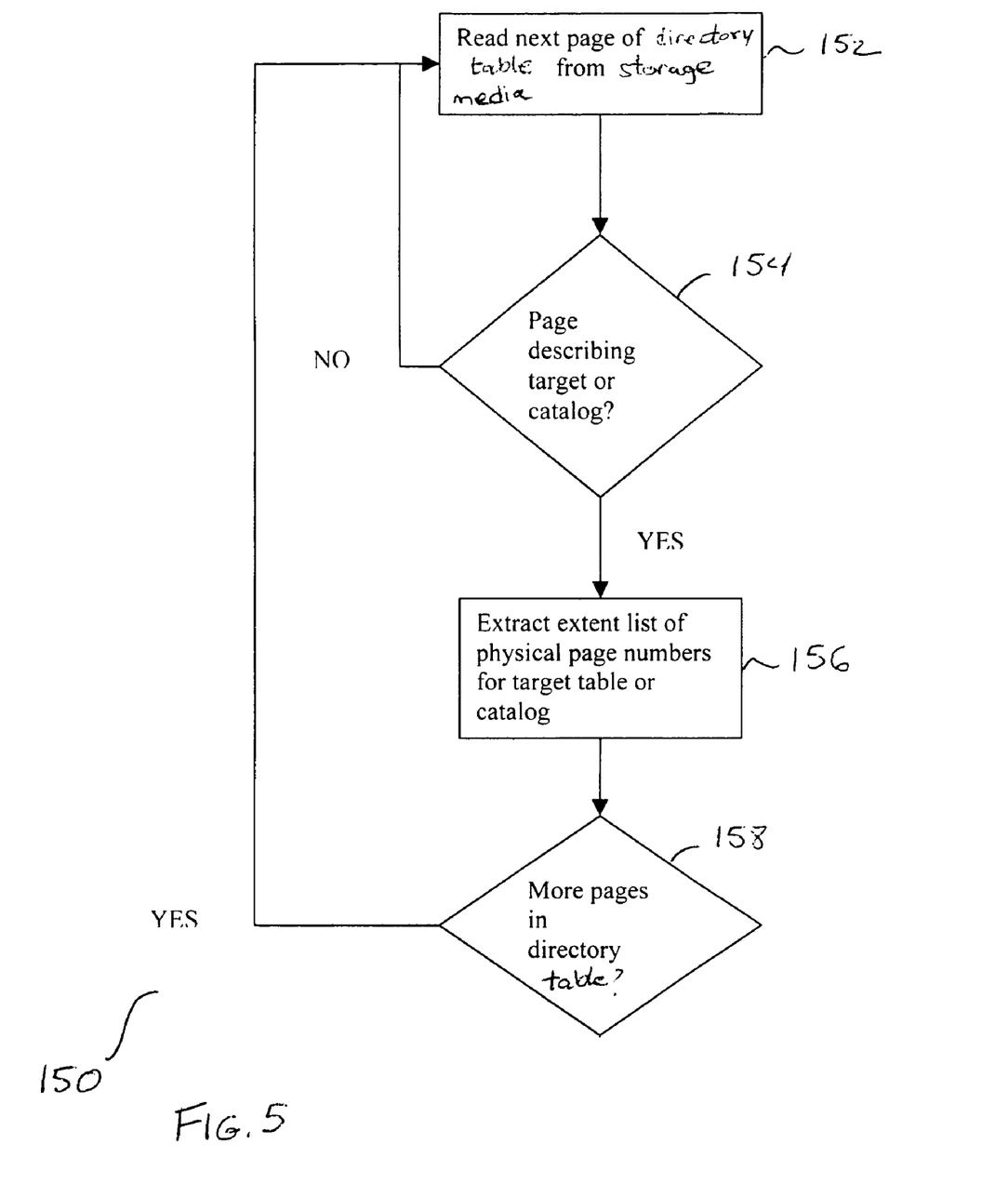
FIG. 5 is a flow chart of a second part of a process for restoring a selected base table from the database.

Following the read of the backup header, the pages of the backup of the database are read from the storage media housing the database backup. FIG. 5 is a flow chart (150) illustrating the process of reading the backup of the database from the storage media according to an embodiment of the present invention. The pages of the database contained within the storage media are stored in pages in physical order. The next page of the directory table is read from the storage media (152). Thereafter, a test is conducted to determine if the page read at step (152) contains data describing the selected base table or associated catalog table(s) (154). A negative response to the test at step (154) will result in a read of the next page of the directory table from the storage media (152). However, a positive response to the test at step (154) will result in an extraction from the extent list of the physical page numbers for both the selected base table or all associated catalog tables (156). The extent list is contained in the directory table and contains a listing of blocks of pages which house the appropriate data for the selected base table and all associated catalog tables. Following the extraction of the extent list at step (156), a subsequent test is conducted to determine if there are more pages in the directory table that have not been read (158). A positive response to the test at step (158) will result in a return to step (152). However, a negative response to the test at step (158) will result in a continuation of the restoration process. Accordingly, the second part of the base table restoration process includes a reading of the table directory and extraction of the extent list indicating the physical page numbers of the selected base table and associated base table(s) to be restored.

Figure 6:
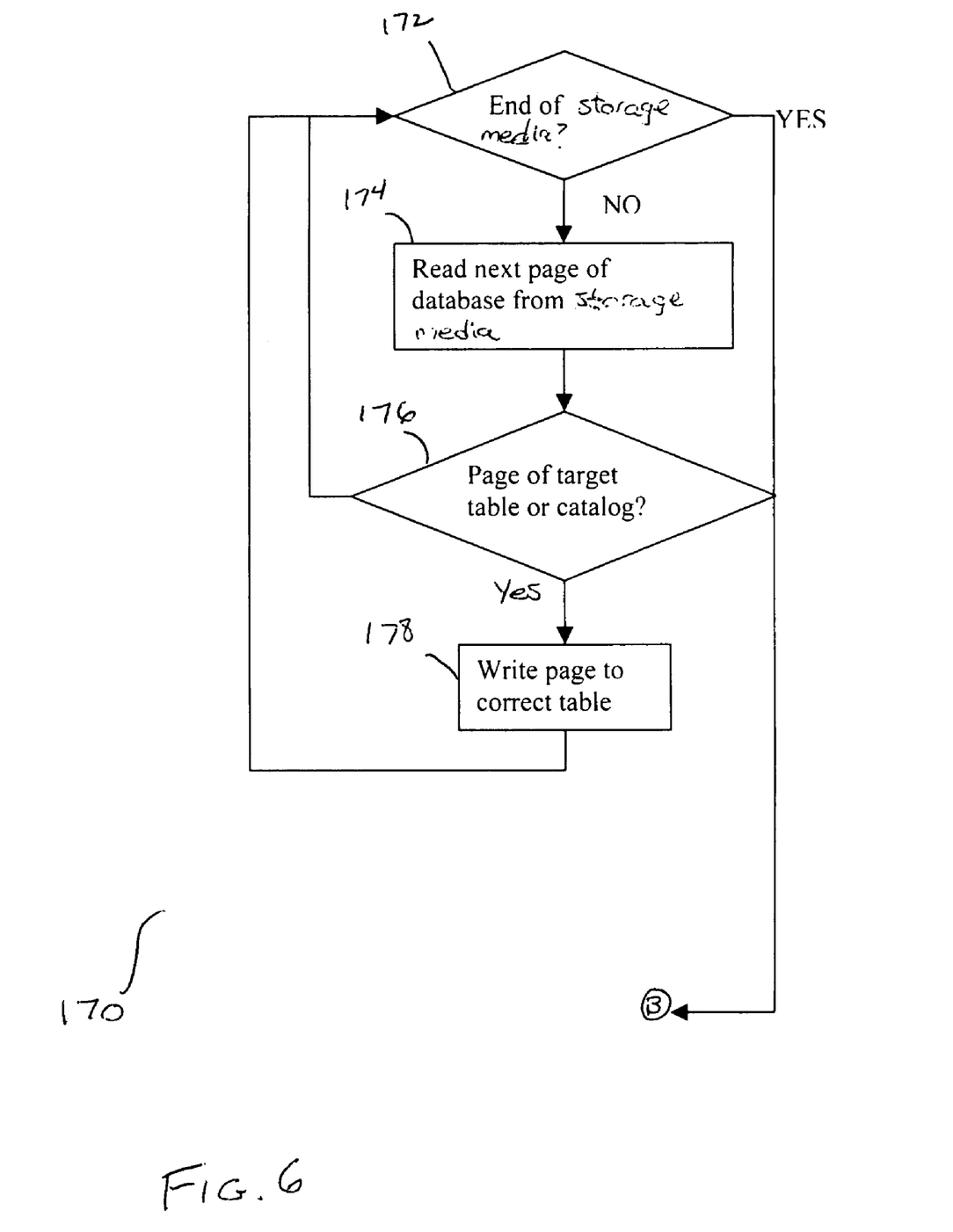
FIG. 6 is a flow chart of a third part of a process for restoring a selected base table from the database.

Once the reading of the table directory has concluded, the restoration process of the selected base table proceeds to read the pages identified by the extent list. FIG. 6 is a flow chart (170) illustrating the process of reading the identified pages from the storage media according to an embodiment of the present invention. The first step is a test to determine if the reading process has reached the end of the storage media (172). A negative response to the test at step (172) will result in a reading of the next page of the database backup on the storage media (174). Thereafter, a subsequent test is conducted to determine if the page of the backup included data pertaining to the specified base table or the associated catalog tables (176). A positive response to the test at step (176) will result in writing the page of data from the storage media to either the specified base table or associated catalog table(s) (178) created at step (136). After writing the page of data, the process returns to step (172). However, if at step (172), it is determined that the end of the storage media has been reached, this is an indication that the specified base table and all associated catalog tables have been populated with the appropriate backup data from the storage media. Accordingly, the third part of the table restoration process completes population of the selected base table and the associated catalog tables from the backup of the database.

Figure 7:
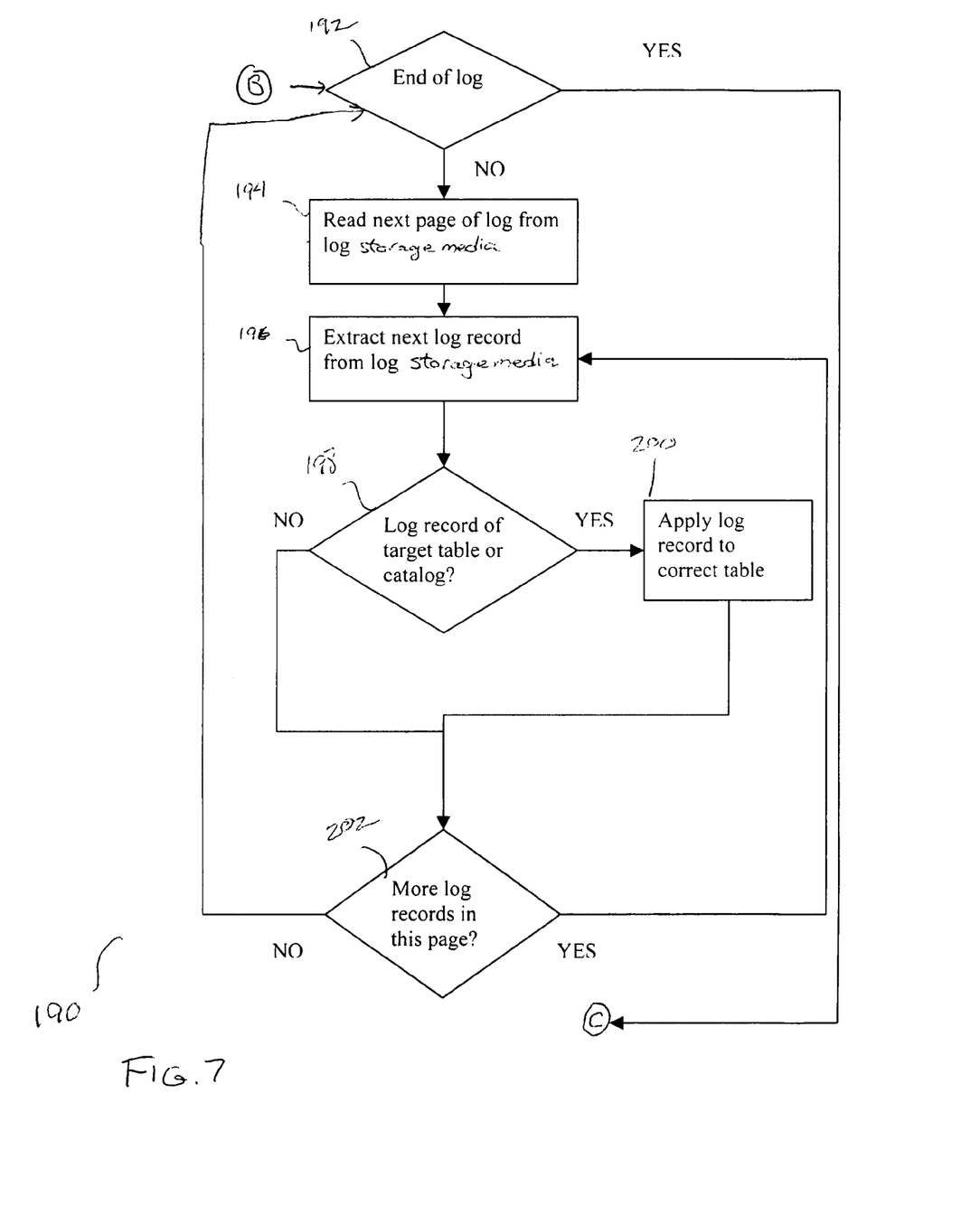
FIG. 7 is a flow chart of a process for applying log data to a restored database table

Both the designated base table and associated catalog table(s) are populated with data from the storage media during the restore process. However, the database continues to change as data within the tables change. Concurrent log records of the database are maintained as data within the database changes. FIG. 7 is a flow chart (190) illustrating the process of applying log data to the restored base table and associated catalog table(s), also known as replaying log data, according to an embodiment of the present invention. The first step in the log replay is a test to determine if the end of the log storage media has been reached (192). A negative response to the test at step (192) will result in a reading of the next page of log information from the log storage media (194). Thereafter, the next log record is extracted from the log storage media (196), followed by a test to determine if the page of log data includes data pertaining to the specified base table or the associated catalog tables (198). A positive response to the test at step (198) will result in applying the log record to the associated table (200), i.e. the base table or catalog table(s). A negative response to the test at step (198) or following the application at step (200), a subsequent test is conducted to determine if there are more applicable log records in this page of the log storage media (202). A positive response to the test at step (202) will result in a return to step (196) for further extraction of appropriate data. A negative response to the test at step (202) will result in a return to step (192) to determine if the end of the log storage media have been reached. Finally, a positive response to the test at step (192) will result in a conclusion of the log replay. The process of applying log data to a restored base table and associated catalog table includes applying intervening changes to table schema to the restored tables to reflect any changes to the table from the time of the backup to the concurrent log of the database. Accordingly, following a restoration of the base table and catalog table(s) from the backup storage media, current data is applied to the restored table(s).

Figure 8:
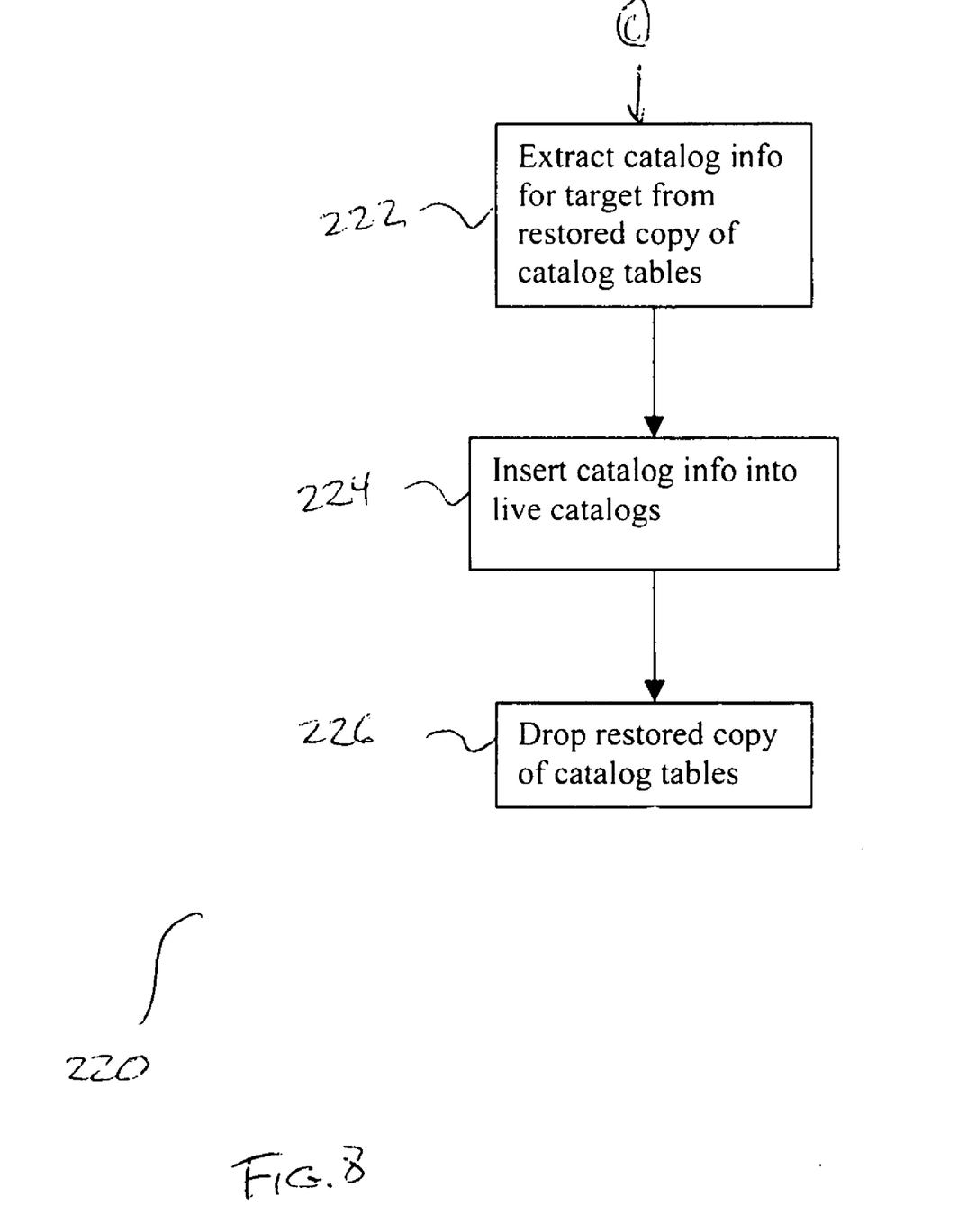
FIG. 8 is a flow chart of a process for removing an extraneous catalog table.

Once the selected base table and associated catalog table(s) have been populated with log data, the restoration process concludes with a clean-up of the restored catalog table, as this table is no longer necessary. FIG. 8 is a flow chart (220) illustrating the process of completing the table restoration process from a backup copy of the database according to an embodiment of the present invention. Catalog table information for the designated base table is extracted from the restored copy of the catalog table(s) (222) and inserted into a corresponding live catalog table (224), i.e. a catalog table that is current. Following the insertion at step (224), the restored copy of the catalog table is destroyed (226). It is not necessary to maintain a restored copy of the catalog table(s) as the catalog table restoration process is only temporary for providing the schema for the restoration of the designated base table. Accordingly, the process of restoring a specified base table restores all associated catalog tables and extracts the meta data in the restored catalog table into a live catalog table.

Advantages Over the Prior Art

The restoration of a specified base table recreates the specified base table and any associated catalog table(s) with the assistance of data stored in the header of the backup copy of the database. Using the header data, the operator can automatically obtain schema for the designated base table. In addition to physical data on the backup storage media, the database has log data which accumulates on separate storage media as data in the database is changed. Once the restoration of the specified base table(s) and associated catalog table(s) have been restored, the log data is read and applied to the restored tables. The purpose of the restoration process is to recreate the base table as of an operator specified point in time while protecting the concurrent copy of the operating database.

ALTERNATIVE EMBODIMENTS

It will be appreciated that, although specific embodiments of the invention have been described herein for purposes of illustration, various modifications may be made without departing from the spirit and scope of the invention. In particular, during the first part of the base table restoration process the remaining pages of the directory table may be omitted once the appropriate extent list for the selected base table has been determined. Accordingly, the scope of protection of this invention is limited only by the following claims and their equivalents.

We claim:

1. A method comprising:
   copying all table metadata, including table name and table identifier data, to a header of a backup storage media during a backup process of a database;
   restoring a select base table from said backup storage media, comprising:
      creating an empty copy of a catalog table associated with a select base table;
      creating an empty copy of said select base table; and
      reading said header from said storage media housing said backup of said database, including extracting table identifier metadata from said header;
   identifying said select base table and all associated base tables;
   reading said backup of said database from said storage media in physical order, including
   extracting an extent list of physical page numbers for said specified base table and associated catalog tables; and
   populating said empty copy of said select base table and associated catalog tables with backup data extracted from said storage media.

2. The method of claim 1, further comprising reading and applying log records to said restored base table and associated catalog tables.

3. The method of claim 2, wherein the step of reading and applying log records to the restored tables includes intervening changes to table schema to reflect any changes to said tables from time of creation of said backup to a concurrent log of said database.

4. The method of claim 1, further comprising cleaning up said restored catalog table, including extracting catalog table metadata for said subject base table from said restored copy of said catalog table, inserting said metadata into a corresponding live catalog table, and destroying said restored catalog table.

5. A computer system comprising:
   a processor;
   a backup manager in communication with said processor and adapted to copy table name metadata, including table identifier data, to a header of a storage media during a backup process of a database;
   a restore manager in communication with said processor and adapted
   to restore a select base table from said backup storage media through
      creation of an empty copy of a catalog table associated with a select base table,
      creation of an empty copy of said select base table, and
      read said header from said storage media housing said backup of said database,
      wherein the read of said header includes an extraction of table identifier metadata; and said restore manager
   to identify said select base table and all associated base tables,
   to read said backup of said database from said storage media in physical order,
      including extraction of an extent list of physical page numbers for said specified base table and associated catalog tables, and
   to populate said empty copy of said select base table and associated catalog tables with backup data extracted from said storage media.

6. The system of claim 5, further comprising a data manager adapted to read and apply log records of a current database to said restored base table and a restored catalog table.

7. The system of claim 6, wherein said data manager is adapted to include changes to table schema from said current database into said restored database to include intervening changes to table schema to reflect any changes to said tables from time of creation of said backup to a concurrent log of said database.

8. The system of claim 5, further comprising a clean up said restored catalog table, including extraction of catalog table metadata for said subject base table from said restored copy of said catalog table, insertion of said metadata into a corresponding live catalog table, and destruction of said restored catalog table.

9. An article comprising:
   a computer-readable data storage medium;
   means in the medium for copying metadata, including table name and table identifier data, to a header of a storage media during a backup process of a database;
   means in the medium for restoring a select base table from said backup storage media, comprising:
      creating an empty copy of a catalog table associated with a select base table;
      creating an empty copy of said select base table; and
      reading said header from said storage media housing said backup of said database, including extracting table identifier metadata from said header;
   means in the medium for identifying said select base table and all associated base tables;
   means in the medium for reading said backup of said database from said storage media in physical order, including extracting an extent list of physical page numbers for said specified base table and associated catalog tables; and
   means in the medium for populating said empty copy of said select base table and associated catalog tables with backup data extracted from said storage media.

10. The article of claim 9, further comprising means in the medium for reading and applying log records to said restored base table and a restored catalog table.

11. The article of claim 10, wherein the means for reading and applying log records to said restored tables includes changes to table schema to reflect any changes to said tables from time of creation of said backup to a concurrent log of said database.

12. The article of claim 9, further comprising cleaning up said restored catalog table, including extracting catalog table metadata for said subject base table from said restored copy of said catalog table, inserting said metadata into a corresponding live catalog table, and destroying said restored catalog table.

* * * * *